United States Patent [19]

Brooks et al.

[11] Patent Number: 4,992,972
[45] Date of Patent: Feb. 12, 1991

[54] FLEXIBLE CONTEXT SEARCHABLE ON-LINE INFORMATION SYSTEM WITH HELP FILES AND MODULES FOR ON-LINE COMPUTER SYSTEM DOCUMENTATION

[75] Inventors: Wayne A. Brooks, Stewartville; Dennis A. Charland, Rochester; Jose V. DiCecco, Rochester; Devon D. Snyder, Rochester; Robert G. Waite, Rochester, all of Minn.; Christopher B. Young, Amherst, Mass.

[73] Assignee: International Business Machines Corporation, Armonk, N.Y.

[21] Appl. No.: 122,154

[22] Filed: Nov. 18, 1987

[51] Int. Cl.⁵ .............................................. G06F 9/00
[52] U.S. Cl. ................................ 364/900; 364/927.2; 364/974.6; 364/948.2; 364/962
[58] Field of Search ................................ 364/200, 900

[56] References Cited
U.S. PATENT DOCUMENTS 4,696,003 9/1987 Kerr et al. ............................ 371/19
4,730,252 3/1988 Bradshaw ............................ 364/403

Primary Examiner—Gareth D. Shaw
Assistant Examiner—John G. Mills
Attorney, Agent, or Firm—J. Michael Anglin

[57] ABSTRACT

On-line documentation for an application program resides in a number of help modules. A display file for the application program specifies command panels to be displayed. The command panel definition includes a mapping of screen areas to help modules as well as a designation of an index-sensitive search table. A user may access the on-line documentation either by pressing a function key for context-sensitive help (which displays the help module mapped to current cursor position) or by entering search words in an entry area for index-sensitive help. Index-sensitive help searches a table of synonyms, roots and topics which map to help modules, and lists the modules associated with the search word ordered by number of hits. Each command panel definition may specify a separate index-sensitive search table, permitting customization of the search to the application. The user then selects one or more of the listed modules for display.

6 Claims, 14 Drawing Sheets

```
                    DISPLAY USER PROFILE ──┬── BASIC    ⎞  201
                                           │   ⎞ 202
                                           │   ⎞
                                          203

USER PROFILE .........................:    QPGMR

DATE PASSWORD LAST CHANGED ...........:    11/11/87
USER CLASS ... .......................:    *PGMR
SPECIAL AUTHORITY ....................:    *SAVSYS
                                            *JOBCTL
GROUP PROFILE ........................: ■  *NONE
OWNER ................................:    *USRPRF
GROUP AUTHORITY ......................:    *NONE
CURRENT LIBRARY ......................:    *CRTDFT
INITIAL MENU .........................:    MAIN
   LIBRARY............................:      *LIBL
INITIAL PROGRAM ......................:    QPGMMENU
   LIBRARY ...........................:      QSYS
LIMIT CAPABILITIES ...................:    *NO
TEXT .................................:    PROGAMMER AND
                                            BATCH USER
                                          ■ ←
                                                        MORE..
PRESS ENTER TO CONTINUE.                  200A

F3=EXIT    F12=PREVIOUS
```

FIG. 2B

```
HELP                         210
GROUP PROFILE                 |          DISPLAY USER PROFILE - BASIC

THE NAME OF THE LIBRARY TO BE USED AS THE
     JOB'S CURRENT LIBRARY FOR JOBS RUNNING UNDER
     THE CONTROL OF THIS PROFILE. *CRTDFT (CREATE
     DEFAULT) INDICATES THAT THE USER HAS
     NO CURRENT LIBRARY.
                                   211

BOTTOM

F2=EXTENDED HELP      F3=EXIT
  F10=MOVE TO TOP       F11=SEARCH INDEX
  F12=PREVIOUS          F13=USER SUPPORT
  F14=PRINT HELP
```

FIG. 2C

DISPLAY USER PROFILE - BASIC

HELP

THE DISPLAY USER PROFILE DISPLAY SHOWS YOU THE
   CURRENT VALUES OF USER ATTRIBUTES FOR THE
   REQUESTED USER. THESE ATTRIBUTES ARE USED BY
   THE SYSTEM TO PERSONALIZE THE WAY THE SYSTEM
   FUNCTIONS FOR EACH INDIVIDUAL USER OR GROUP.

IF YOU SEE "MORE..." ON THE LOWER RIGHT SIDE
   OF YOUR DISPLAY, THERE IS MORE INFORMATION
   TO VIEW. PRESS PAGE DOWN (OR ROLL UP) TO
   MOVE TOWARD THE BEGINNING OF THE INFORMATION.

IF YOU SEE "BOTTOM" INSTEAD OF "MORE...",
   YOU ARE AT THE END OF THE INFORMATION.

WHEN YOU HAVE FINISHED VIEWING THE BASIC USER
   PROFILE INFORMATION, PRESSING "ENTER" WILL RETURN
   YOU TO WHERE YOU WERE WHEN YOU REQUESTED THE
   USER PROFILE TO BE DISPLAYED. OR, IF YOU
   SPECIFIED THE *ALL OPTION FOR THE "TYPE"
   PARAMETER ON YOUR REQUEST, PRESSING ENTER WILL
   PROGESS THROUGH DISPLAYS OF THE FOLLOWING
   INFORMATION:

221                     MORE...

F2=EXTENDED HELP    F3=EXIT
   F10=MOVE TO TOP     F11=SEARCH INDEX
   F12=PREVIOUS        F13=USER SUPPORT
   F14=PRINT HELP

FIG. 2D

230
SEARCH INDEX

INDEX SEARCH ALLOWS YOU TO TELL THE SYSTEM TO SEARCH FOR SPECIFIC INFORMATION.

1. TYPE THE PHRASE OR WORDS TO SEARCH FOR.

2. PRESS "ENTER".

WHEN YOU PRESS "ENTER", THE SYSTEM SEARCHES FOR THE TOPICS RELATED TO THE WORDS YOU SUPPLIED AND DISPLAYS A LIST OF ALL TOPICS FOUND.

IF YOU DO NOT TYPE ANYTHING, THE SYSTEM WILL DISPLAY A LIST OF ALL AVAILABLE TOPICS.

TYPE WORDS TO SEARCH FOR. PRESS ENTER. ╱─232
  _USER_SECURITY_____

F3=EXIT    F12=PREVIOUS

FIG. 2E

MAIN SYSTEM INDEX

POSITION CURSOR, TYPE OPTION, THEN PRESS ENTER.
    5=VIEW TOPIC      6=PRINT TOPIC

OPT    TOPIC
  -    CHGUSRPRF (CHANGE USER PROFILE) COMMAND
  -    CRTUSRPRF (CREATE USER PROFILE) COMMAND
  -    DLTUSRPRF (DELETE USER PROFILE) COMMAND
  -    DSPAUTUSR (DISPLAY AUTHORIZED USERS) COMMAND
  -    DSPUSRPRF (DISPLAY USER PROFILE) COMMAND
  -    GRTUSRAUT (GRANT USER AUTHORITY) COMMAND
  ▪    USER ID AND USER PROFILE
  -    CONTROLLING SECURITY
  -    DATA AUTHORITY
  -    DSPOBJAUT (DISPLAY OBJECT AUTHORITY) COMMAND
  -    GRTOBJAUT (GRANT OBJECT AUTHORITY) COMMAND

244                                            MORE...

OR TO SEARCH AGAIN, TYPE NEW WORDS, PRESS ENTER.
  _USER_SECURITY_____

F3=EXIT    F12=PREVIOUS    F11=ALL TOPICS

FIG. 2F

USER ID AND USER PROFILE — 250

WHEN YOU SIGN ON THE SYSTEM, YOU ENTER YOUR
USER ID TO TELL THE SYSTEM WHO YOU ARE. ——— 251
THE USER ID MAY BE THE SAME AS YOUR NAME
OR ANOTHER STRING OF CHARACTERS.

THE USER ID IS ACTUALLY THE NAME OF A USER
PROFILE STORED IN THE SYSTEM. THIS USER PROFILE
CONTAINS INFORMATION ABOUT WHAT THE SYSTEM
SHOULD DO WHEN YOU SIGN ON (FOR EXAMPLE, WHICH
MENU TO SHOW YOU FIRST OR WHICH PROGRAM TO
RUN FIRST) AND WHAT YOU ARE ALLOWED TO DO
(FOR EXAMPLE, WHAT OBJECTS YOU OWN OR ARE
ALLOWED TO USE AND WHAT SPECIAL AUTHORITIES
YOU HAVE). YOU CAN CHANGE PART OF YOUR OWN
USER PROFILE FROM THE USER TASKS MENU.

IF SYSTEM RESOURCES ARE SECURED, THE USER
PROFILE ALSO SPECIFIES A PASSWORD, WHICH IS
A UNIQUE STRING OF CHARACTERS YOU MUST ENTER
IN ADDITION TO YOUR USER ID WHEN YOU SIGN ON.
YOU CAN CHANGE YOUR PASSWORD FROM THE USER
TASKS MENU.

MORE...

F3=EXIT     F12=PREVIOUS

FIG. 2G

```
:HELP NAME='USER_ID_PROFILE'.
:ISCH ROOTS='USER ID PROFILE SECURE'. USER ID AND USER PROFILE

WHEN YOU SIGN ON THE SYSTEM, YOU ENTER YOUR USER ID TO TELL
THE SYSTEM WHO YOU ARE. THE USER ID MAY BE THE SAME AS YOUR
NAME OR ANOTHER STRING OF CHARACTERS.

THE USER ID IS ACTUALLY THE NAME OF A USER PROFILE STORED IN
THE SYSTEM. THIS USER PROFILE CONTAINS INFORMATION ABOUT
WHAT THE SYSTEM SHOULD DO WHEN YOU SIGN ON (FOR EXAMPLE,
WHICH MENU TO SHOW YOU FIRST OR WHICH PROGRAM TO RUN FIRST)
AND WHAT YOU ARE ALLOWED TO DO (FOR EXAMPLE, WHAT OBJECTS YOU
OWN OR ARE ALLOWED TO USE AND WHAT SPECIAL AUTHORITIES YOU
HAVE). YOU CAN CHANGE PART OF YOUR OWN USER PROFILE FROM
THE USER TASKS MENU.

IF SYSTEM RESOURCES ARE SECURED, THE USER PROFILE ALSO
SPECIFIES A PASSWORD, WHICH IS A UNIQUE STRING OF CHARACTERS
YOU MUST ENTER IN ADDITION TO YOUR USER ID WHEN YOU SIGN ON.
YOU CAN CHANGE YOUR PASSWORD FROM THE USER TASKS MENU.

THE SECURITY OFFICER FOR YOUR SYSTEM CAN CREATE A NEW USER
PROFILE BY ENROLLING A NEW USER THROUGH THE SECURITY MENU OR
BY USING THE CRTUSRPRF (CREATE USER PROFILE) COMMAND.
WHEN A USER PROFILE IS CREATED, IT IS IDENTIFIED TO THE
SYSTEM AS A SPECIFIC OBJECT TYPE. THE SYSTEM-RECOGNIZED
IDENTIFIER FOR THIS OBJECT TYPE IS *USRPRF.

:EHELP.

:ISCHSYN ROOT='ID'.ID IDS IDENTIFIER IDENTIFIERS IDENTIFICATION
                  IDENTITY
:ISCHSYN ROOT='PROFILE'.PROFILE PROFILES DEFINITION DESCRIPTION
:ISCHSYN ROOT='SECURE'.SECURE SECURED SECURITY
ISCHSYN ROOT='USER'.USER USERS OPERATOR OPERATORS WORKER WORKERS
:ISCHSYN ROOT='USER'.CLERK CLERKS SECRETARY SECRETARIES BOSS
                    BOSSES
ISCHSYN ROOT='USER'.MANAGER MANAGERS SUPERVISOR SUPERVISORS USR
```

FIG. 3

FLEXIBLE CONTEXT SEARCHABLE ON-LINE INFORMATION SYSTEM WITH HELP FILES AND MODULES FOR ON-LINE COMPUTER SYSTEM DOCUMENTATION

BACKGROUND OF THE INVENTION

The present invention relates to electronic data processing, and more particularly concerns a system and method for providing on-line documentation for interactive application programs.

There is a growing belief in the data-processing community that the same data processor which executes interactive programs requiring documentation should also provide that documentation to the user of the application: that the processor should both perform the program and guide its performance.

The most common form of on-line documentation is "on-line help," or "help text," which mostly provides reference-manual type of information available at the touch of a dedicated or programmable-function key. Some large interactive application programs provide "context-sensitive" help text, in which the help facility detects which particular part of the application the user is involved with when he presses the Help key. The facility then automatically selects a portion of the help text appropriate to the operation the user wishes to perform. Context-sensitive help may operate on several levels, providing general information about an entire display screen, or zooming in to more specific help when the user places a cursor in a particular area of the screen dealing with the aspect of the display he wishes to study in more detail.

Many forms of context-sensitive on-line information exist. For example, D.A. Charland has proposed ("On-line Documentation: Promises and Problems," in *Proceedings, 31st International Technical Communication Conference*, Apr. 29–May 2, 1984, Society for Technical Communication, pages WE-158 to WE-161) the use of small, linked information modules for this purpose. Commonly assigned U.S. Pat. application "On-Line Documentation for Data-Processing Programs," Ser. No. 790,705, filed Oct. 24, 1985 by R. Sladowski, et al., shows a method for creating and using a help document which can be used both as context-sensitive help and as a stand-alone, freely browseable on-line manual for an application program.

Another conventional method for extracting data from on-line information involves the entry of keywords by the user. A search facility then searches through the on-line text, or a relevant part of it, to find the portion containing the selected keyword.

Again, many forms of on-line document searching are available. One form, described by P. Orwick, et al. ("DOMAIN/DELPHI(tm): Retrieving Documents Online," in *CHI '86Proceedings*, Apr. 1986, pages 114–121), allows a user to enter a search word or phrase and to specify manually which portions of the information he wishes to include. The search finds text in the specified portion which contain all the entered words in the phrase. Another form, and presented by J. Walker (*Online Documentation and help Systems*, Symbolics, Inc., Apr. 5, 1987, especially pages 61–64), allows either context-sensitive help or keyword-entry help from the same on-line information. Although multiple search words can be entered at the same time, the search facility finds the text which contains all of those words—that is, it performs an "and" search.

Although many different approaches have been implemented to provide useful on-line information, particularly help text, the general opinion is that users still find it unwieldy and cumbersome to use, and they must frequently refer to the printed documentation accompanying the application program. See, for example, the recent article "Read My Mind: What Users Want From Online Information," *IEEE Transactions on Professional Communication*, Vol. PC-30, June 1987, pages 87-90, discusses the reactions of users to many of the conventional approaches. The fact remains, users do not make nearly the full use of on-line information; and the problem seems to lie in the documentation, not in the users.

SUMMARY OF THE INVENTION

The present invention makes on-line information such as help text for an application more natural and easy to use. It combines context-sensitive and keyword, or "index-sensitive," access modes in a way which reduces the need for paper documentation for the application program. The user may navigate through the on-line documentation freely, and may employ multiple index terms and see the relevance of certain portions before accessing them. The user interface is simple, to avoid intimidating even novice users.

The information itself can be easily and quickly produced by technical writers having little or no programming skills. The same information can be used for multiple application programs, either in the same way for all programs, or organized differently for each program. In fact, it is possible to organize the material differently for every display screen of a single program, if desired. Conversely, different users may be given different information for the same application program, depending, for example upon their security level or the range of applications they use.

These goals are achieved at a relatively low cost in processor storage and execution time required for accessing the on-line facility. Both the access and the creation of the information use only slight modifications to conventional programs, tools, and data structures already in wide use and familiar to many people.

These and other advantages of the invention accrue from the combination, in a data-processing system having a display and a keyboard, of a help object containing relatively small, independent modules of text, a display file modified to include designations of help areas, an index object containing tables for translating input search words into designations of the help modules for providing intermixed context-sensitive and flexible index-sensitive help for an application program which employs the display file for its interactions with a user. The cooperation of these elements is achieved under the control of a conventional application program, a nearly conventional operating-system display manager, and a novel help manager. Another aspect of the invention combines displayed index-input and list panels to present requested index-sensitive information to the user ordered by its relevance to the search request he enters, to present a sort of abbreviated table of contents before he needs to read through all the information obtained from his request. A further aspect involves building on-line information from a source document by analyzing tags in the document to construct the help modules in the help object, and tables for specifying and linking user-input words to root words and topics associated with the modules.

BRIEF DESCRIPTION OF THE DRAWING

FIG. 2, comprising FIGS. 2A-2G, illustrates a series of panels accessed by an operator using the invention.

FIG. 3 is a portion of a source document incorporating help modules according to the invention.

DESCRIPTION OF A PREFERRED EMBODIMENT

In the following example, the present invention will be employed to provide on-line help text for an operator using an interactive operating system on a mid-range business-oriented data processor. The invention may be employed in other areas as well. The on-line information may, for example, relate to other functions, such as glossaries or encyclopedias. The application program may be of various types, such as a text processor, or may even be an entire suite of programs, such as an office system. The processor which hosts the invention may be of any conventional type, using conventional systems programs except where indicated.

Figure 1:
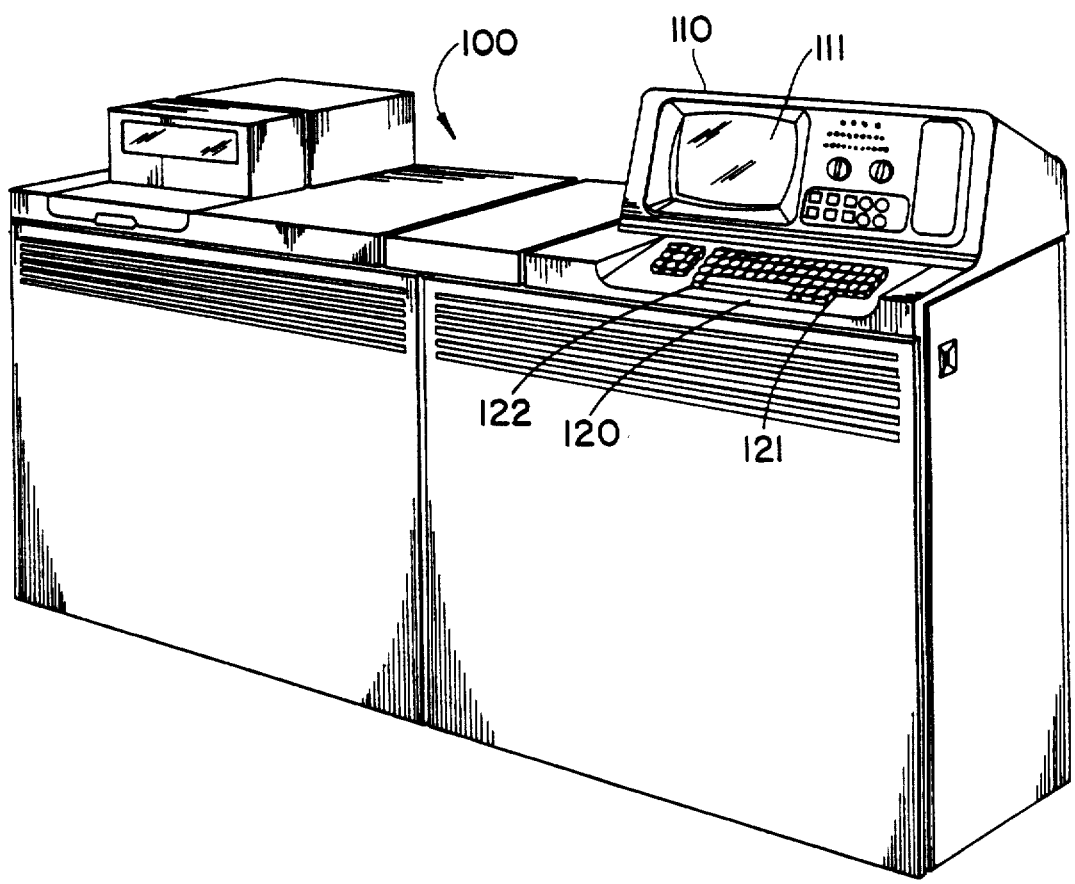
FIG. 1 depicts a data-processing system upon which the invention may be practiced.

FIG. 1 shows a publicly available IBM System/38 data processor 100 having a console display 110 for displaying data to a user, and having a keyboard 120 with which the operator may enter data. Processor 10 has a conventional operating-system program named "CPF" (Control Program Facility) which accepts commands from keyboard 12 and displays them and other information on display 110. The operating system may also present menus on display 110 for command entry by positioning a cursor 111 on the display and entering command parameters via keyboard 120. Keyboard 120 also includes a conventional "help" key 121 and a number of programmable function keys ("F-keys") 122 which may be assigned to particular functions by the operating system or by the user.

Figures 2A, 2B:
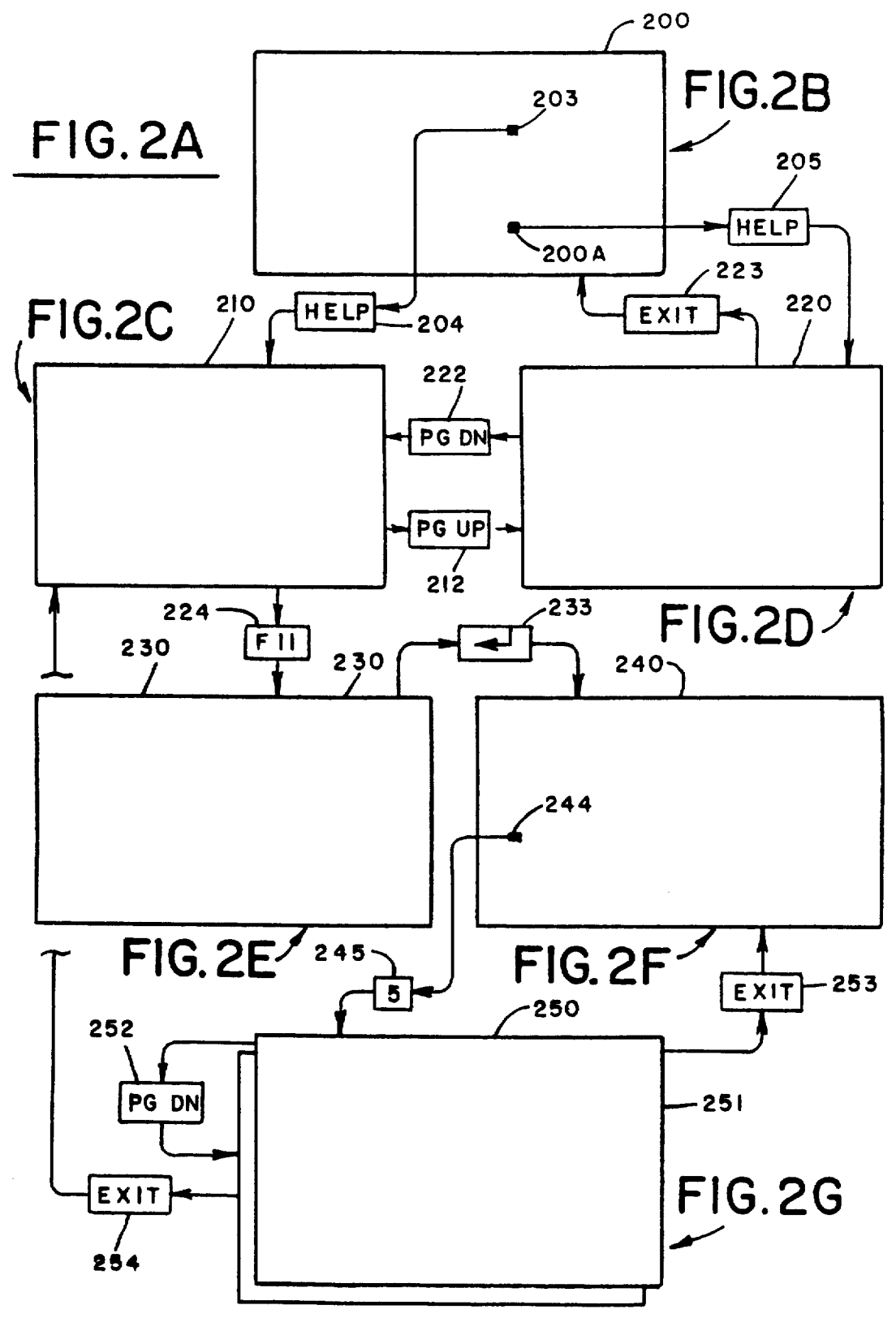

FIG. 2A shows a sequence of screens, each of which is shown individually in FIGS. 2B-2G.

FIG. 2B shows an example of a conventional task panel 200 of the System/38 operating system, which might be presented to a user on display 110, FIG. 1. Text lines such as 201 each name a different parameter for processing a particular command of the operating system. Each text line has an input field 202 to enter data for that parameter. The user moves the display cursor 203 to the input fields using conventional control keys on the keyboard, then types in the data. When all input fields have been completed, the user presses the "Enter" key on the keyboard. The operating system accepts the parameters and performs the specified command.

If the user wishes help, he presses the keyboard "Help" key at 204. If at that time the cursor is located in the input field 202 of one of the parameters, then the task panel 200 is overlaid on the display screen with a help-text panel 210 containing text 211 describing the parameter whose field the cursor 203 is located in. If cursor 203 is not in any of the input fields of panel, then pressing Help key 205 brings up a help-text panel 220 which describes the command generally in text lines 221. In either case, additional panels can be displayed by using the keyboard scroll keys, such as "Page Down" at 222. In the case of the general help panel 220, the panels for all specific parameters such as 210 may be scrolled as though they were part of the general panel 220. Scrolling can be backward as well as forward, as indicated by the "Page Up" key at 212. When the user is finished with the help facility, he presses an "Exit" function key as at 223 to return task panel 200 to the display. (This key is actually the "F3" programmable-function key on the keyboard.) This is known as "context-sensitive" help, since the help panel presented to the display varies, depending upon the what the user is about to do—that is, depending upon the context of the task.

Sometimes the user wishes to know information not directly related to the panel he is viewing. For example, he might look at a panel concerning file transfers and wish to know the details of how a valid file name is constructed. The present invention allows the user to access help information other than context-sensitive help. While viewing help panel 210, for example, he may press the "Search Index" key (labelled "F11" on the keyboard) at 224. This "index-sensitive" help is available from any help panel such as 210, 220, etc. Although this embodiment makes index-sensitive help available only from a help panel, it would also be possible to allow it to be accessed directly from a task screen as well, if desired.

Pressing the F11 key causes a search-index panel 230 to overlay the previous help panel 210 on the display screen. Panel 230 contains text 231 which tells him how to enter search words, and which provides an input field 232. The user types a word or phrase describing possible subjects of interest into input field 232, then presses the "enter" key at 233. The help facility parses the input phrase into individual words. Short structural words such as "of" and "the" are implicitly discarded, since they are not represented in the index of terms. It then finds all modules of help text relevant to the words in the input phrase, and constructs an ordered list of their titles. List panel 240 then overlays panel 230 on the display. Panel 240 has a number of lines such as 241, each containing the title 242 of a particular help module and an input field 243. The lines on panel 240 are arranged in order of the number of correspondences between all input search words and index terms in each help module describing that module. Any of the topics in the list may be selected by moving the cursor 244 to its input field and pressing a number keyboard key at 244. In addition, the input line 232 of panel 230 is repeated as line 244 at the bottom of panel 240, to remind the user of how he obtained the particular selections.

Pressing the "5" key displays an index-help panel 250 containing text 251 dealing with the subject chosen, overlaying panel 240. (Pressing "6" instead of "5" would have printed out panel 250, instead of displaying it.) Further panels in the same help module may be accessed with the scroll keys, such as "Page Down" at 252. If he wishes to search additional words, he may return to the list panel 240 by pressing a "Exit" (F3) keyboard key. The original search phrase is retained on line 244; he may then enter additional words and/or replace any or all of the original words on input line 244 and repeat the cycle of panels 240-250 as many times as desired.

If the "Exit" key is again pressed (or is pressed when the user is initially at screen 230), at 245, help panel 210, which was displayed when the index-help function was initially accessed, is redisplayed. The user may also press the "Exit" key at 254 to return directly to the previously displayed context-help panel 210.

The set of help panels such as 210 for context-sensitive help may be the same as the set of index-sensitive help panels such as 250. Alternatively, the set of context-help panels and modules may be partially or totally different from the index-help panels.

FIG. 3 shows a small portion of a help document 300 containing a number of individual help modules. Each module occupies one or more display panels such as 210, FIG. 2. Document 300 may be prepared by a technical writer without any programming knowledge, using any one of a number of conventional text editors.

In this example, document 300 is written is a widely known tag-based language called "generalized markup language" (GML), which uses symbols prefaced by a colon or a period in the first column of the text. Period-tags are primitive operations; colon tags are other operations defined (by GML users as well as by programmers) in terms of the primitive operations. For example, conventional GML uses a ".*" as at 301 to indicate a comment line which is not to appear in the final document; the ":P." tag signifies the beginning of a new paragraph, and may be defined as a carriage return, a new line, and five spaces for indented paragraphs, or as a carriage return and two new lines for block paragraphs. Tags may take parameters; the ":H2." (level-2 heading) tag may set a bold display attribute, then print (or display) the following heading text.

Functions required for the present invention are performed by several specially defined tags not found in the conventional GML repertoire. The writer specifies the extent of a single help module by placing a ":HELP" tag 311 at its beginning and an ":EHELP" tag 312 at its end in the source text of document 300. The beginning tag 311 takes a keyword parameter specifying the NAME of the module. The ":ISCH" tag 313 names a number of ROOT words as being relevant to the help text 314 in the module. The text following the period on the same line denotes the title of module. Another tag 315, ":ISCHSYN" names a number of synonyms for the root word placed after the equal sign. A module may have multiple ":ISCHSYN" tags for different root words specified by the ":ISCH" tag. Thus, a single module may have many root words, and many synonym words for each root word. The synonyms are useful not only for specifying variants for a particular term, but also for translating the modules into different languages, where the root words may be left in the original language, and only the synonyms need be translated. Additionally, dialect or slang terms may be made synonyms, as well as common misspellings.

Figure 4:
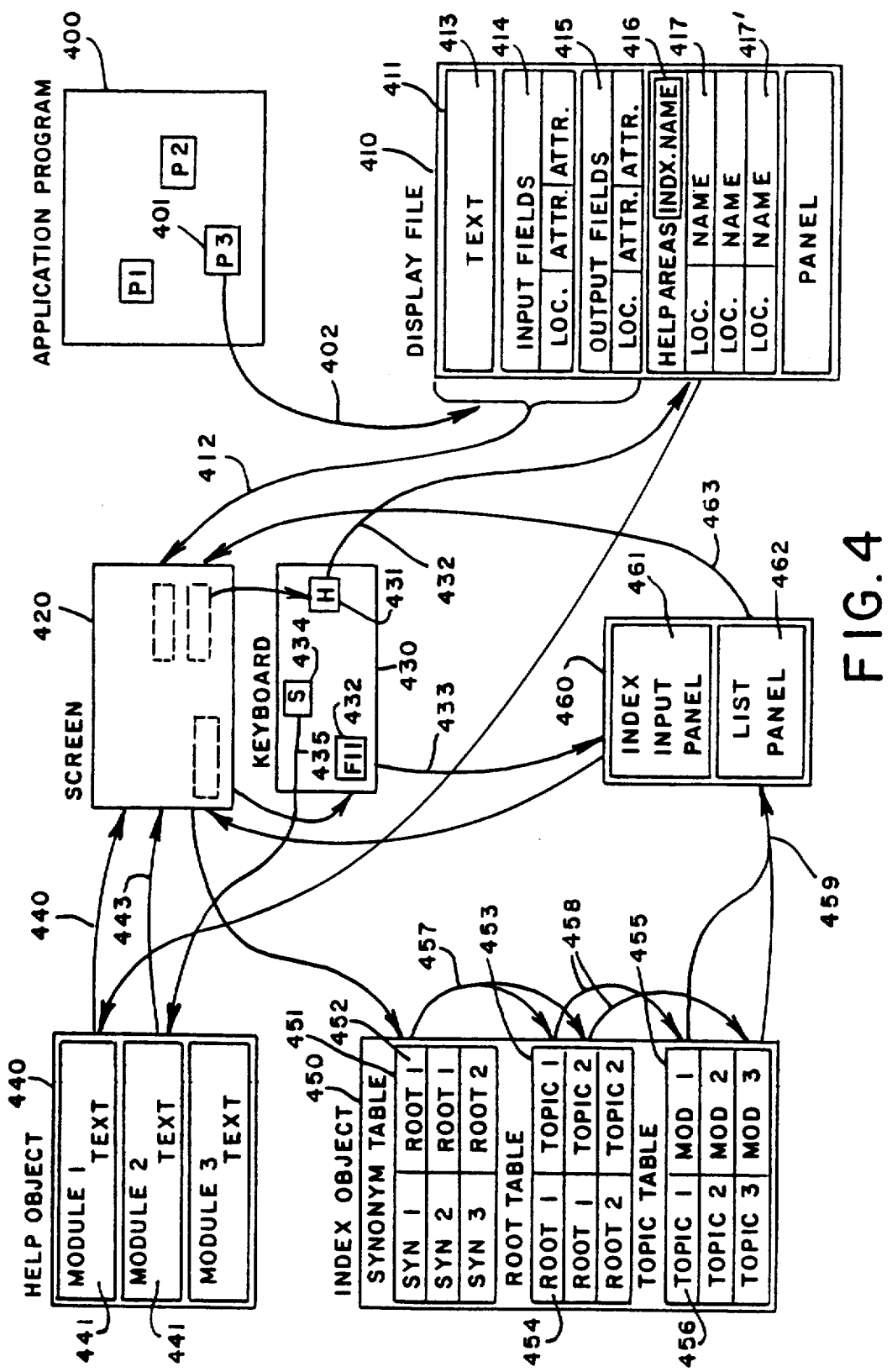
FIG. 4 shows the interaction of the elements of the invention.

FIG. 4 shows various elements of the invention and their interaction in accessing help panels.

Conventional application program 400 in this example is an interactive operating system using command panels for display to and input from a user. Display file 410 contains a number of individual command-panel definitions such as 411 for display on display screen 420, as indicated by arrow 412. Conventional call/return points such as 401 designate a particular panel definition 411 in the display file 410 to be presented on display screen 420 at a predetermined point in the execution of application program 400, as indicated by arrow 402.

Each command panel contains fixed text characters 413 to be displayed. Each panel may also have one or more input fields 414, in which the user may enter data by moving the cursor thereto with cursor-movement keys on keyboard 430, and then typing in the data and pressing an "Enter" key. Each input-field specification 414 has individual entries for determining the location (LOC) of the field on display 420 and the attributes (ATTR) with which the field data is to be displayed (such as color, reverse video, etc.). For character-mode display screens, the location of a field is specified by the character row and column of its upper left corner and the row and column of its lower right corner. Output fields such as 415 present variable text from application 400: results of operations, error messages, responses to user input, and so on. Output fields are specified in the same manner as input fields.

To carry out the invention, command-panel definitions 414 further include a set 416 of help-area definitions. The entire set 416 carries a designation of an INDEX NAME specifying the name of a particular index object 450 to be accessed for help panels for that command panel. (Normally, the index object will remain the same for all panels in a given application 400, and sometimes for an entire suite of applications; but the capability is available for naming different indexes for every command panel if desired.)

Each help-area entry such as 417 in the set 416 contains a location LOC, specified in the same manner as are the input and output fields. Each entry also includes a name which corresponds to the name of a particular help module in help object 440.

The locations of different help areas may overlap each other; the area actually used for a given cursor location is found by searching their list of entries 417 in order, and designating the first entry whose LOCation includes the actual position of the cursor. In this way, a final entry 417' can serve as a general help designator, by including the entire screen in its LOCation. The final entry 417' may NAME a general help module for the entire command panel 411, and this module will be picked up if the cursor is outside the areas for all other help-module entries for that panel.

Help object 440 is a conventional "object" of the System/38 processor; it carries a name which identifies it as a whole, and it may have members at various levels also known to the system by unique names within their own object. (The object names are stored by the system, and do not appear in the objects themselves; they are actually a form of virtual address for the objects. The name of a module is a composite of the help-object name and the name of the help module within that object, since module names are not known to the system outside of the objects in which they reside.) In this case, the members of object 440 are the help modules such as 441. The (composite) names of the individual modules are the names in the help-area entries 417. Object 440 does not link the help modules 441 together in any special order or sequence.

Index object 450 is another System/38 object, and has an identifying name. This name is the one referenced in the INDEX NAME field of help-area definition 416, above.

One of the members of object 450 is a synonym table 451 for linking synonyms entered by the user to root words describing the individual help modules 441. Table 451 contains a number of entries, such as 452, having one synonym SYNn and an associated root word ROOTn. Table 451 is "many-to-many"; that is, a particular synonym such as SYN1 may appear in multiple entries along with different root words ROOT1, ROOT2, etc. Also, a single root word may map to multiple synonyms, so that a particular root word ROOT2 might appear in multiple entries associated with different synonyms SYN1, SYN2, etc.

Another member of object 450 is a root table 453 for linking root words to the topics covered by the individual help modules. Each entry, such as 454 contains one root word ROOTn and an associated help-module topic TOPICn. Again, table 453 is a many-to-many organization; the same root word such as ROOT1 may appear in multiple entries with different topics TOPIC1, TOPIC2, etc., and the same topic TOPIC2 may appear in multiple entries with different root words ROOT1, ROOT2, etc.

A topic table 455 links the individual topics with specific help modules 441. Each entry such as 456 contains a particular topic TOPICn, and an associated help-module name MODn. Table 455, unlike the previous tables, is one-to-one in the present embodiment. That is, topics are made unique to each help module 441. Only one index object 450 is shown in FIG. 4; but, as mentioned earlier, multiple index objects could exist for a single help object 440, in order to access it in different ways from different application programs or even from different command panels in the same application program.

A simple object 460 contains several fixed panel definitions employed by the help facility. The index-input panel 230 (FIG. 2) definition 461 is included, as is the list panel 240 definition 462. These definitions are conventional in form, and may have text, input fields and output fields as shown at 413–415 for the panel definitions 411 in display file 410.

The arrows in FIG. 4 show how the described elements participate in the use of the help facility.

Initially, application program reaches call/return 401, and calls for the presentation on display 420 of a command panel according to a particular definition 411, as portrayed by arrow 402. Entries 413–415 format the panel and send it to the display, arrow 412. The user may move the display cursor 421. If the cursor is within a defined help area 417, as indicated by the dotted box 422, the user may request context-sensitive help for the command associated with that area by pressing Help key 431 at arrow 423. Arrow 432 then indicates searching the help-area file until an entry 417 contains a LOCation specification which includes the screen location of cursor 421. Arrow 418 accesses the help module 441 having the NAME contained in entry 417, and presents its first panel to display 420 at arrow 442. As described earlier, the user may then scroll through any additional panels, and may return to the command panel by pressing the Exit key.

Index-sensitive help is requested during the display of a context-sensitive help panel by pressing the "Index Search" (F11) key 432, if that key is listed on the panel as being available for that panel. Arrows 433 and 463 symbolize the formatting and presentation of the list panel, defined in 461, to display 420, overlaying the context-help panel. The user then reads its text and enters a search word or phrase into defined input area 424, using keyboard 430. His entry is parsed into individual words corresponding to synonyms defined for the help modules. Thus, arrow 425 searches the entries of table 451 to match entered word(s) against the synonym fields, and extracts the root words(s) which correspond to these synonyms. Arrows 457 then apply the extracted root word(s) to a search of the root-word fields of table 453. Arrows 458 extract the topic fields of the root-word table entries whose root-word fields match the synonyms extracted from table 453, and apply them to the topic fields of table 455. Arrows 459 extract the help-module names from table 455 for those entries whose topic fields match the topics extracted from table 453.

Arrow 463 formats and sends the list panel 462, containing the ordered list of topics, to display 420. When the user moves the cursor to the desired line's input field and presses the "5" key 434, arrow 435 communicates this choice to the chosen help module 441', and arrow 443 presents the first panel of that module to display 420. As described above, the index-help panel may be terminated with the keyboard "Exit" key.

Figure 5:
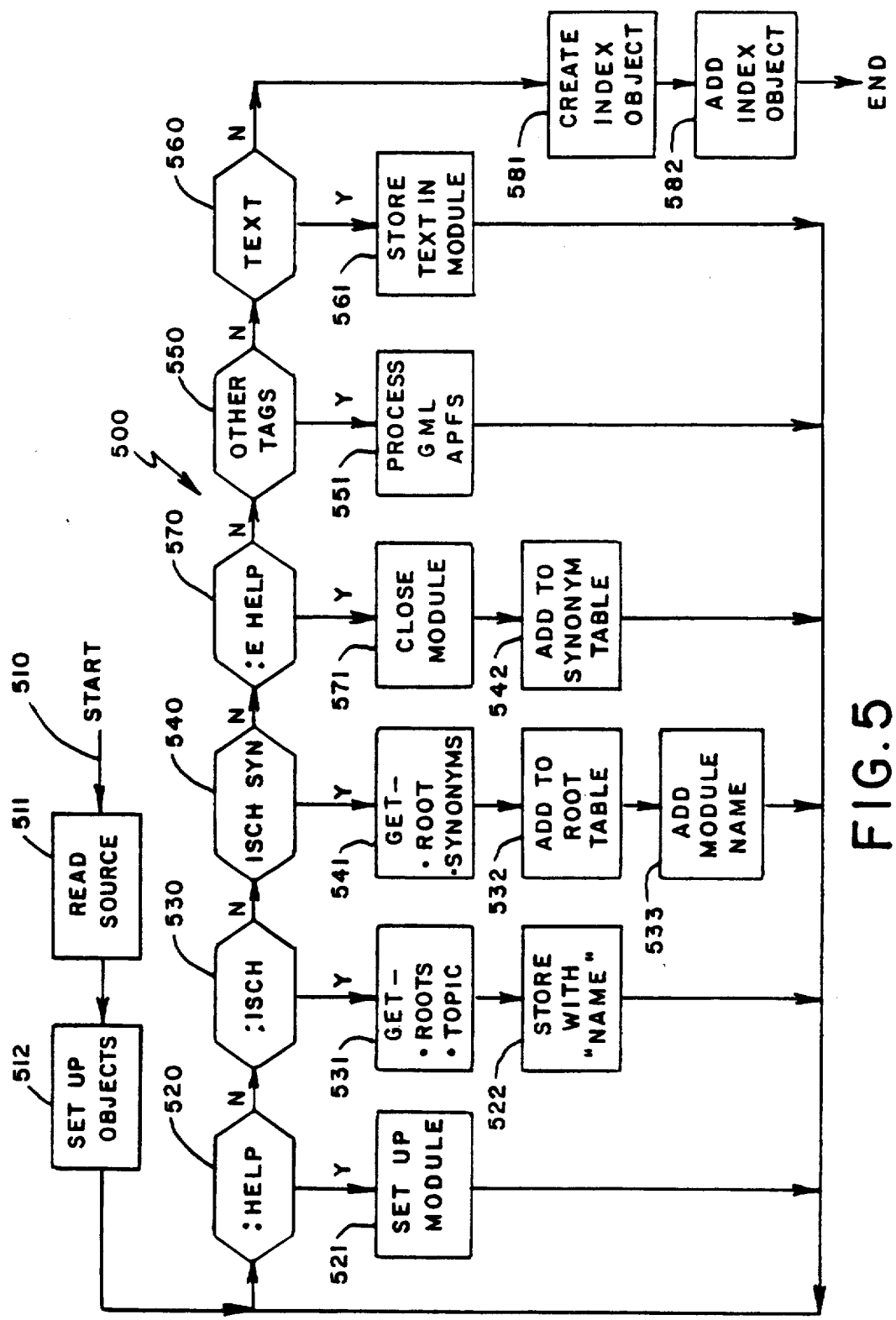
FIG. 5 shows a method for creating the help and index objects of FIG. 4.

FIG. 5 outlines the creation of the help object 440 and the index object 450, FIG. 4, by a program which is very much like the publicly available IBM Document Composition Facility (which embodies the GML tags). Program 500 starts at block 501 by reading source document 300, FIG. 3; then block 502 sets up help and index objects 440, 450, FIG. 4. Decision block 510 has different exits depending upon the next token in the stream of source text.

If the token is a ":HELP" tag 520, block 521 sets up a new module 441 as a member of object 440. Block 522 stores it under the NAME specified in the tag.

If the token is an ":ISCH" tag 530, block 531 extracts the root words and the topic from the tag's parameters. Block 532 creates a new entry 454 in root table 453 for every root word, and plugs the topic from the ":ISCH" tag into the TOPIC fields of each new entry 454. Block 533 creates a new entry 456 in table 455, and plugs into that entry the module NAME and the topic, which comprises the phrase following the period in the tag.

If the tag is an ":ISCHSYN" tag 540, block 541 extracts the root word and the associated synonym words from the tag parameters. For each synonym word in the tag, block 542 creates a new entry 452 in synonym table 451, and stuffs the root word and a synonym word into the ROOTn and SYNn fields respectively If the tag is any conventional GML tag 550, a conventional GML APF routine 551 processes it. Block 561 stores text characters 560 in the help module 441 in a format determined by the conventional GML tags 550.

If the tag is an ":EHELP" tag 570, the formatted text is stored, 571, and the help module is closed.

After any of the tokens 510–550 or text 560, the next token or text is processed by block 510.

When the end 580 of the document is encountered, all of the help modules and all of the tables are lumped together in the help object. The index object is constructed in a conventional manner as follows. The System/38 CPF instruction "Create Search Index" 581 allocates an empty index object 450. An index object is a conventional System/38 object used to index other objects for faster searches, in the same manner as, say, a B-tree index of a flat data file can be created and sorted on a designated combination of key fields in the data file in order to search the data file faster for that combination of keys. (And, just as for index files, multiple index objects can be used to search the same help object.) Then, the conventional CPF command "Add Search Index" 582 adds whatever help modules the writer specifies to the index object. That is, the writer specifies which help modules in help object 440 he wishes to be included in the index object 450; the ASI instruction then indexes those table entries 452, 454, and 456 which pertain to those modules; the help modules themselves are not transferred to object 450. In fact, even the tables 451, 453, and 455 are not actually transferred, but only the key values required to use them in the manner described in connection with FIG. 4. The tables themselves are shown in object 450 for convenience of understanding.

Figure 6:
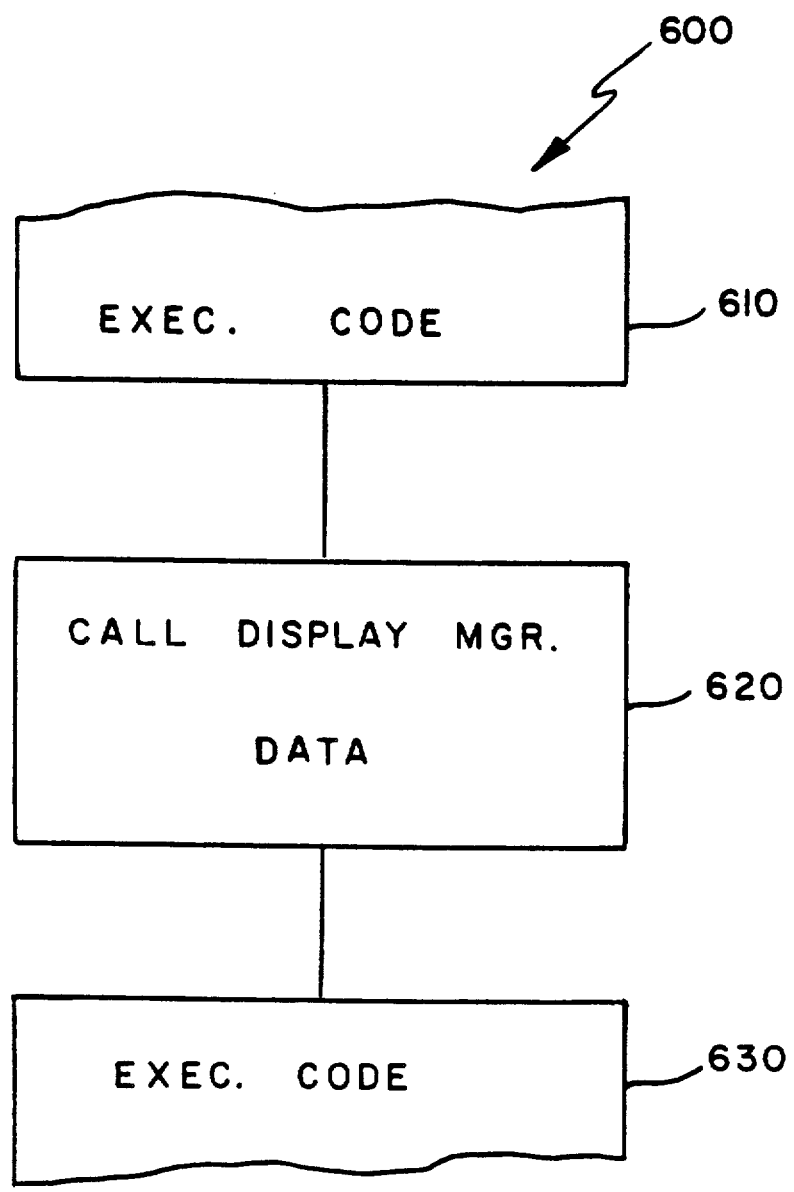
FIG. 6 shows a conventional method for creating the display file and linking it to the application program of FIG. 4.

FIG. 6 briefly outlines the conventional process of writing an application program using a display file. Flowchart 600 shows a portion of executable code 610 for the application. To present a display, a conventional "Call" 620 is included, which calls the display manager and transmits to it the necessary data for the display file and panel to be displayed at that point. When control returns to the application at 621, the subsequent processing instructions 630 will be executed.

Figure 7A:
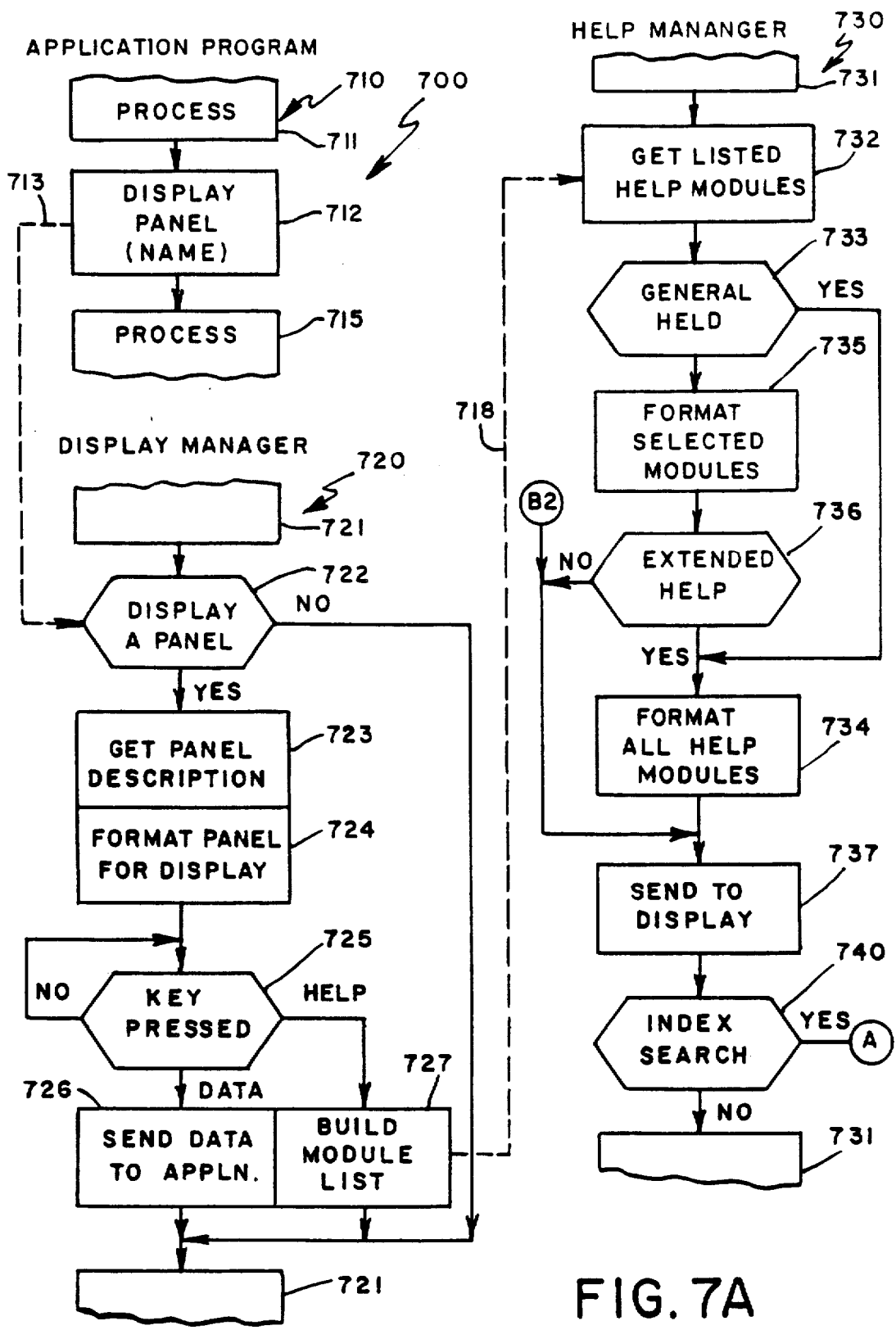
FIG. 7 is a flow chart for accessing the help modules of FIG. 4 according to the invention.
Figure 7B:
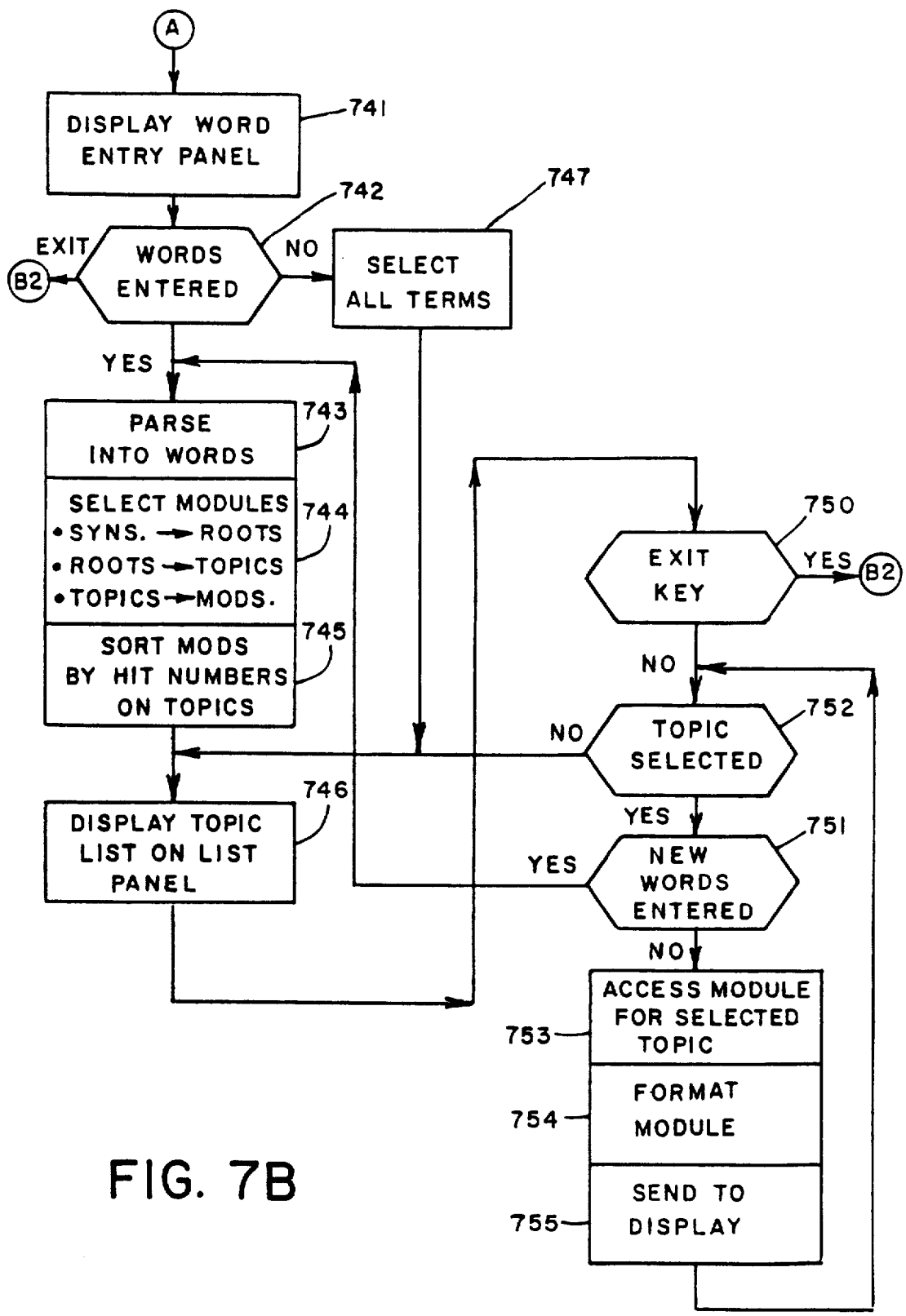

FIG. 7, comprising FIGS. 7A and 7B, is a flowchart 700 showing the interaction of three programs: the application program, the display manager program, and the help manager program. As previously noted, the application program is a conventionally written program using a display file for interaction with a user.

Routine 710 executes processing instructions 711 of application program 400, FIG. 4, until it reaches an exit where a command panel must be presented to the display. Block 712 represents a conventional routine for dispatching a task to a display manager program; the task includes data specifying the type of task, the name of the display file 410, FIG. 4, and the name of the particular panel in the display file 411. This request is symbolized by dashed arrow 713. The display manager may also return user-input data to the program 710 via dashed arrow 714. Application 710 then continues processing as shown at 715.

Routine 720 executes tasks at blocks 721 until block 722 indicates that a display task has been dispatched to it. At this point, block 723 obtains the names of the display file and panel to be displayed, and block 724 formats the panel from the definition 411 and transmits it to the display 420. If the user enters input data at block 725, block 726 sends it to the application via arrow 714. This much of the display manager 720 is entirely conventional, and is a part of the publicly available CPF operating system for the System/38 processor.

If the key pressed at 725 is the Help key, block 727 builds a list of the relevant help modules for context-sensitive help from the LOCations and NAMEs of the help areas in the definition 411 for the panel, according to the position of cursor 421, as previously described. Arrow 728 dispatches the names of the help modules to a help manager on arrow 728. The actual mechanism is that block 727 builds an ordered list of all the modules for the particular command panel, and designates the list numbers of the first and last modules to be displayed. Thus, more than one module can be selected for display, even though only one module may have met the LOCation requirements. In particular, the last help-area entry 417' in FIG. 4 is a general help for its entire command panel, and it has been set up to have its own help module and to include all the other specific modules for that command panel. Thus, general help is the composite of all the help modules in 416, even though only one of them, 417', actually met the selection criterion.

Help-manager routine 730 cycles through blocks 731 until a request for context-sensitive help is received at arrow 728. Block 732 then obtains the requested help modules 441 according to the names in the list sent by display manager 720. If block 733 indicates that general help for the entire command panel was requested, then block 734 formats all requested help modules. If specific help was requested, only the selected modules—i.e., the ones within whose LOCations the cursor resided—are formatted by block 735. Then if block 736 indicates that general help was requested (by pressing the F2 function key on the keyboard), block 737 sends the formatted modules to the display 420 one panel at a time.

If during a help-panel display, block 740 detects a request for index-sensitive help, then block 741 displays the search-entry panel 461, FIG. 4. Block 742 obtains the search phrase entered by the user, and block 743 parses them into words. Block 744 selects the relevant help module names by translating the user-input words—the synonyms—into the appropriate root words (via table 451), then the root words into topics (table 453), and the topics into module names and titles (table 455). Block 745 sorts the module names into an ordered list sequenced according to how many times its TOPIC was accessed in the topic table 455 by all of the search words entered by the user. Block 746 then displays this list, formatted in the list panel 462, on display 420. If the user had entered no words but had merely hit the "Enter" key at 742, block 747 would select all TOPICs from table 455, and list all the help modules for those topics, then transfer to block 746. The user could also have pressed the Exit key at block 742, and returned directly to block 737.

Block 750 allows the user to return to block 737 by pressing the "Exit" key. If he does not, he may enter new search words at block 751. Blocks 743–747 process these new synonyms as before. If no topics have been selected, block 752 returns to block 746 to display again the list panel 462. Otherwise, block 753 obtains the module for the selected topic, via topic table 455. Blocks 754 and 755 format the selected module and transmit it to display 420. Control then returns to block 752.

We claim as our invention:

1. A system for providing on-line information for a data processor capable of executing an interactive application program having associated therewith a display file including a set of definitions for command panels, comprising:
- a display for presenting display panels to a user, said display including a movable cursor;
- an input device coupled to the system for accepting commands and data from said user;
- a plurality of help modules contained in at least one help object or file stored in the system;
- a plurality of command-panel definitions stored in the system, at least some of said command-panel definitions having a help area contained therein, said help area including a set of help-area entries each associating a help module with a location area for said cursor;
- a context-sensitive selection means, coupled to the display and to the input device, for selecting a help module which the command-panel definition associates with a location area containing the cursor, said means being responsive to the position of the cursor and to a command received from the user via the input device;

at least one index object or file stored in the system, including a plurality of synonym table entries each associating a synonym word specifying a potential search argument by said user with a root word associated with at least one of said help modules, a plurality of root table entries each associating one of said root words with a topic pertaining to one of said help modules, and a plurality of topic table entries each associating one of said topics with one of said help modules, wherein a synonym word is associated with an associated help module if and only if said synonym word is associated with an associated root word by a synonym table entry, said associated root word is associated with an associated topic by a root word table entry, and said associated topic is associated with said associated help module by a topic table entry;

a search argument input means, coupled to said display and to said input device, for displaying an index input panel and for accepting from said user at least one of said synonyms as search arguments;

an index-sensitive selection means, coupled to said display and to said input device, for displaying a list panel listing those of said help modules associated with said search argument synonyms by said index object or file, and for accepting from said user a designation of at least one of said modules for presentation from said help object on said display, said index-sensitive selection means being responsive to said search argument input means; and a help display means for displaying information contained in a selected help module, said help display means being responsive to the context-sensitive selection means and the index-sensitive selection means.

2. The system for providing on-line information of claim 1, wherein:

the system comprises at least two index objects or files;

the help area within the command-panel definition further contains an indicator associating one of the index objects or files with the command panel; and the search result selection means lists only those help modules which are associated with the search argument synonym by the index object or file associated with the command panel from which the user requested on-line information.

3. The system for providing on-line information of claim 1, wherein:

the context-sensitive selection means and index-sensitive selection means may select more than one module; and the help display means further comprises means for scrolling between different selected help modules responsive to commands received from the user via the input device.

4. The system for providing on-line information of claim 3, wherein:

the system comprises at least two index objects or files;

the help area within the command-panel definition further contains an indicator associating one of the index objects or files with the command panel; and the search result selection means lists only those help modules which are associated with the search argument synonym by the index object or file associated with the command panel from which the user requested on-line information.

5. The system for providing on-line information of claim 1, wherein:

the listing of help modules associated with search argument synonyms displayed by the index-sensitive selection means is ordered by number of associations between search argument synonym and module.

6. The system for providing on-line information of claim 4, wherein:

the listing of help modules associated with search argument synonyms displayed by the index-sensitive selection means is ordered by number of associations between search argument synonym and module.

* * * * *

UNITED STATES PATENT AND TRADEMARK OFFICE
CERTIFICATE OF CORRECTION

PATENT NO. : 4,992,972

DATED : February 12, 1991

INVENTOR(S) : Wayne A. Brooks, Dennis A. Charland, Joseph V. DiCecco, Devon D. Snyder, Robert G. Waite and Christopher B. Young It is certified that error appears in the above-identified patent and that said Letters Patent is hereby corrected as shown below:

On the title page, item [75]:

The name of the inventor "Jose V. DiCecco" should be changed to --

Joseph V. DiCecco

Signed and Sealed this

Eleventh Day of August, 1992

Attest:

DOUGLAS B. COMER

*Attesting Officer*   *Acting Commissioner of Patents and Trademarks*